Dec. 6, 1966  R. McPHERSON  3,290,084
CAMPER BODY INTERCHANGEABLE BETWEEN SEDAN AUTOMOBILES
Filed May 11, 1964  3 Sheets-Sheet 1

INVENTOR
RANDALL McPHERSON

BY

ATTORNEYS

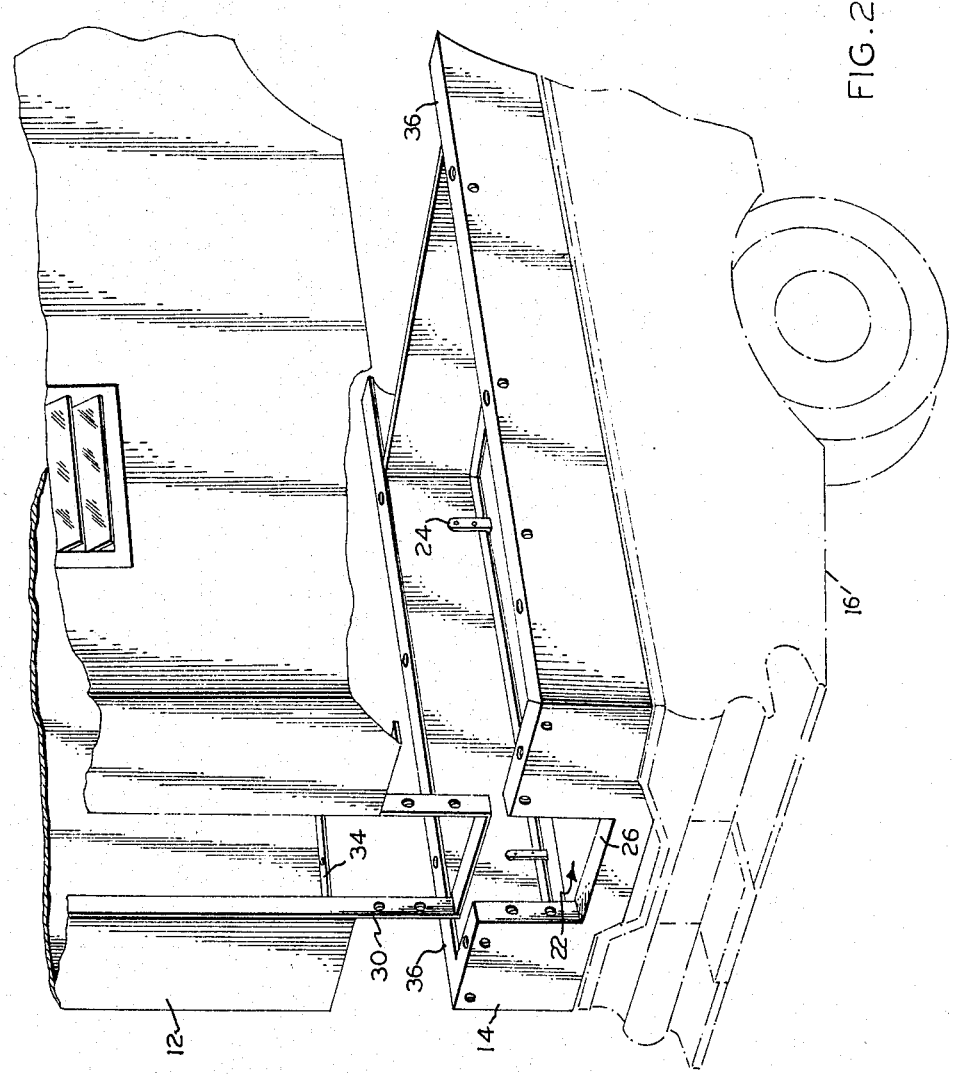

Dec. 6, 1966  R. McPHERSON  3,290,084
CAMPER BODY INTERCHANGEABLE BETWEEN SEDAN AUTOMOBILES
Filed May 11, 1964  3 Sheets-Sheet 3

INVENTOR
RANDALL McPHERSON
BY
ATTORNEYS

3,290,084
CAMPER BODY INTERCHANGEABLE BETWEEN
SEDAN AUTOMOBILES
Randall McPherson, P.O. Box 575, Burkesville, Ky.
Filed May 11, 1964, Ser. No. 366,331
8 Claims. (Cl. 296—23)

The present invention relates to an auxiliary enclosed body or "camper" unit which may be readily affixed to and transported by a conventional sedan model passenger automobile, and more particularly to a composite camper-body unit wherein a major relatively expensive body portion thereof is readily adaptable to the large majority of automobiles on the highway by use of an inexpensive minor adaptor body portion, and which also provides maximum sleeping accommodations.

With increasing leisure time as well as a trend toward larger families, there is a growing desire for motor travel on the part of families to see and enjoy together the scenic wonders and natural beauty as well as the historical heritage of the United States and North America generally. As a result thereof, there is an increasing demand for personally-owned transportable sleeping accommodations, commonly referred to as "camper" units, for use in conjunction with a family car to maximize mobility as well as to minimize the expense of lodging while traveling. At the present time, enclosed sleeping accommodations of this general type are widely available in the form of trailers which are attached to and towed by the automobiles in the form of relatively expensive auxiliary bodies which must be carried by pick-up trucks rather than the family car. Inasmuch, however, as the great majority of auto-owning families possess two- or four-door closed sedans, there is a need for a camper body which can be mounted directly upon the automobile and which will provide sufficient sleeping accommodations for the family or group party, whereby the burdensome expense of purchasing or renting a second vehicle in the form of a pick-up truck, towed trailer or like second vehicle for relatively infrequent vacation use is eliminated.

By virtue of the general diversity of the specific external form or styling of sedan automobiles, it has heretofore been impractical to provide a supplemental camper body except as high-priced custom-fitted installations, or similar small-volume adjunct bodies which are limited in practicability inasmuch as the same are designed for only a single make or model year of automobile.

It is therefore a principal object of my invention to provide a supplemental camper body which may be mass-produced and yet accommodate the vast majority of sedan model automobiles at a minimized cost and which may be carried or transported by any sedan without material modification of the camper body proper.

It is a further object of my invention to provide a standardized camper body wherein adaptability to various sedan makes and models is obtained by the use of a relatively inexpensive adaptor portion of my composite body which is configured to the particular automobile and which mounts the standardized camper body. Correlatively, the camper body of my invention may be retained for subsequent use by an automobile owner at the time of a trade-in or purchase of a new automobile, by the mere substitution of the small adapter unit designed for the newly acquired automobile in lieu of the one previously owned, whereby replacement or purchase of an entire new camper body is obviated.

It is a further object of my invention to provide a camper body, which while affixed to a standard sedan, as compared to a pick-up truck or separate trailer, yet provides maximum sleeping accommodations which indeed often exceed those in larger camper units currently available.

It is an additional object of my invention to provide a camper body which effectively utilizes the rear deck trunk space of the standard sedan, thereby increasing the available space in the supplemental camper unit.

Other objects and advantages of my invention will be apparent from the following detailed description, taken in conjunction with the accompanying drawings illustrating a preferred embodiment thereof, wherein—

FIG. 2 is a fragmentary exploded perspective view showing the mode of connection between the major camper body portion, adapter unit, and a passenger sedan shown in phantom.

Figure 1:
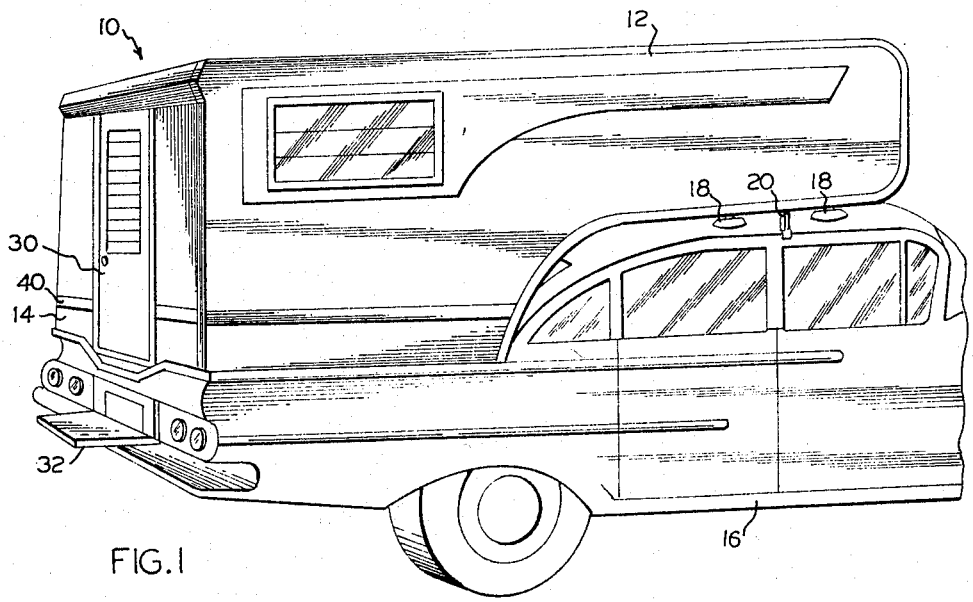
FIG. 1 is a perspective view of the camper unit of my invention employed in conjunction with a late model sedan.

Referring to the drawings, the composite body camper unit or transportable enclosed sleeping accommodation unit 10 comprises a major body portion 12 and a minor adapter portion 14, as illustratively mounted on a four-door sedan automobile 16.

The body portion 12 and adapter portion 14 are detachably connected together as a composite unit, as will be explained hereinafter, and the forward part of the major body portion 12 which overlies the sedan roof is affixed thereto in conventional fashion as by suction cups 18 and turnbuckle clamp devices 20, which latter conventionally secure to the rain gutter of the car roof.

A sedan automobile is normally provided with a trunk area 22 (FIGS. 3 and 6) along the rearwardly extending deck of the automobile behind the passenger area of the car, the trunk area being normally closed by a trunk lid, which latter is removed by the owner and stored prior to mounting of my camper 10 on the automobile.

In addition to the conventional securing means 18, 20 at the forward part of the upper body portion 12 of the camper, the body 10 is firmly detachably secured to the vehicle by means of L-shaped or similar brackets 24 (FIG. 2) which are secured as by bolts to the inside wall of the adapter unit 14 and project within the trunk area 22 to clamp tightly beneath the vehicle body flanges surrounding the trunk or rear deck opening. Two such clamping brackets are illustrated along one wall of adapter 14, although it will be appreciated that a greater number may be provided at convenient or available locales depending upon the particular model of automobile employed and the particular adapter 14 designed therefor.

The adapter element 14 is substantially rectangular and surrounds the trunk area 22 and thus overlies the rear deck of the car generally. The unit 14 is contoured along its lower perimeter so as to be complementary to the particular styling of the automobile, whereby the adapter 14 may be secured firmly and in leakproof relation thereto. Conventional padding, cushioning and sound insulating rubber or like gasket means are provided between the lower periphery of the adapter 14 and the rear deck area of the car which deaden sound, render the same leakproof, and prevent undesirable marring of the car finish. In any of the several adapters porvided for the standard camper 12, the same are preferably provided with a cut-out portion 26 defining the lower portion of a door and door jamb assembly 30 carried by the camper body 12. As is often desirable and conventional, a suitable step plate 32 (FIG. 1) may be affixed to the rear bumper or bumper support brackets to facilitate step entry and exit to the camper.

A significant feature of my invention resides in the fabrication of the principal camper body 12 and the cooperative adapter element 14 as separate units, whereby the major body portion 12 which houses the sleeping accommodations and other major structure of the camper may be fabricated in a standardized form for use with any of a variety of models or makes of sedans. This facility is possible by virtue of the adapter unit 14 which constitutes only a small and inexpensive portion as compared to the overall size and price of the entire composite camper body 10.

Figure 4:
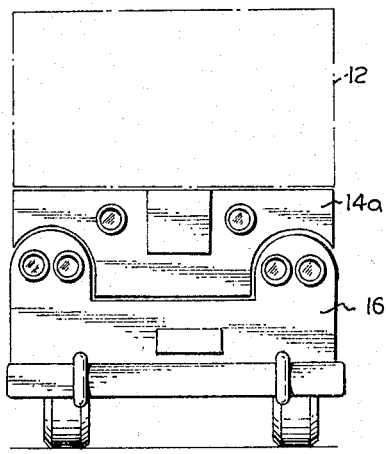
FIG. 4 is a diagrammatic end elevation exemplifying one form of automobile and an adapter unit therefor, receiving the standard camper body shown in phantom.

The adapter element 14, as above noted, principally constitutes only a substantially rectangular frame element wherein a plurality of the adapter units will be provided with a variety of lower peripheral contours as required for complementary mating attachment of diverse stylings and configurations of automobile rear deck and fender areas. This is exemplified in FIGS. 1, 4 and 5, wherein it will be noted that the adapter 14 of FIG. 1 is of a peripheral and lower edge configuration to be conveniently attached to the particular sedan 16 illustrated. Likewise, in FIG. 4, the adapter 14a has a configuration corresponding to the rear deck and trunk contour opening of a differently styled automobile 16a, wherein, however, the same standardized body unit 12 may be attached thereto.

Figure 5:
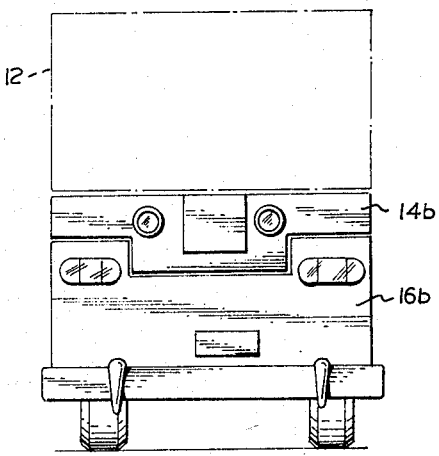
FIG. 5 is similar to FIG. 4 and shows another form of automobile and an adapter unit therefor.

In similar fashion, the standardized camper major body portion 12, without alteration, may likewise be transported by an automobile 16b having other exemplary styling characteristics as in FIG. 5, in which case a relatively inexpensive perimetral frame adapter 14b is provided therefor which mates in substantially complementary relation with the rear deck of the automobile and is likewise affixed thereto as by connectors 24 (FIG. 2).

Figure 3:
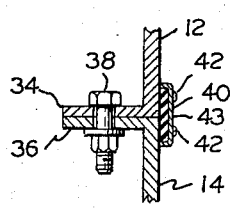
FIG. 3 is a fragmentary side elevation disclosing the mode of connection between the major camper body portion and the adapter.

The lower terminal edge of the major camper body portion 12 is provided with apertured inturned flange means 34 or comparable structure which cooperates and aligns with similar apertured flanges 36 provided on each adapter unit 14 whereby the body unit may be quickly and easily attached as by suitable bolt means 38, FIG. 3, to the camper minor portion 14 after the latter has been secured to the automobile 16. In order to enhance the appearance of the auxiliary unit 10, as well as to insure against rain leakage along the horizontal joint between the upper and lower portions 12, 14, and external trim strip 40 spans the joint between the body portions 12 and 14 and is secured thereto as by self-tapping screws 42. A suitable packing or gasket material 43 such as sponge rubber, polyurethane foam, is received within the channeled trim strip 40 to seal the joint. If desired for further sealing or sound deadening purposes, a layer of gasket material may also be provided between the confronting flanges 34, 36 of the body portions 12, 14 as well as between the lower perimeter of adapter frame 14 and the car body proper as mentioned hereinbefore. The trim and seal strip 40 extends along both side walls of the auxiliary body unit as well as along the end wall thereof on either side of the door 30, and the upper and lower body portions 12, 14 are provided with small apertures at spaced intervals corresponding to those in the trim strip for reception of the securing screws.

Not only does the auxiliary body 10 of my invention achieve the versatility of interchangeable use between differing models of automobiles with only minimal expense in requiring only the various adapter units 14 for varying styles of automobiles for conjoint use with the same major body portion 12, but also the camper body of my invention by its design and use of the trunk space of the automobile, provides maximum passenger accommodations therewithin for sleeping and other purposes.

Figure 6:
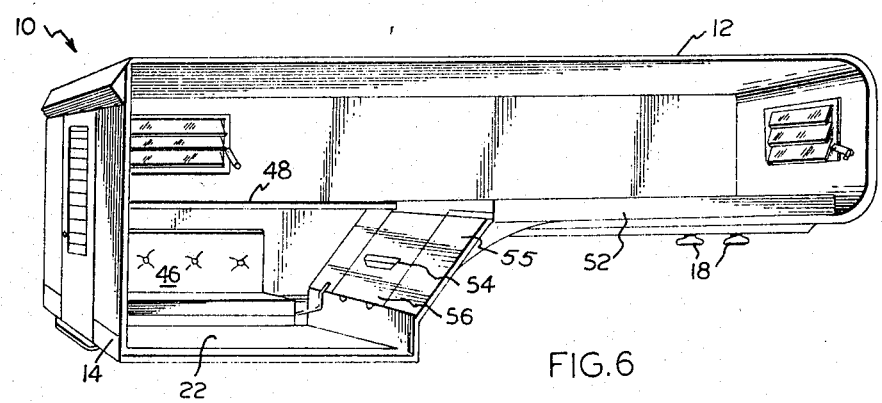
FIG. 6 is a perspective elevation of the interior of the camper body showing its relationship to the automobile trunk upon which it is mounted, a side wall of the camper unit and associated seat portion being removed for clarity.
Figure 7:
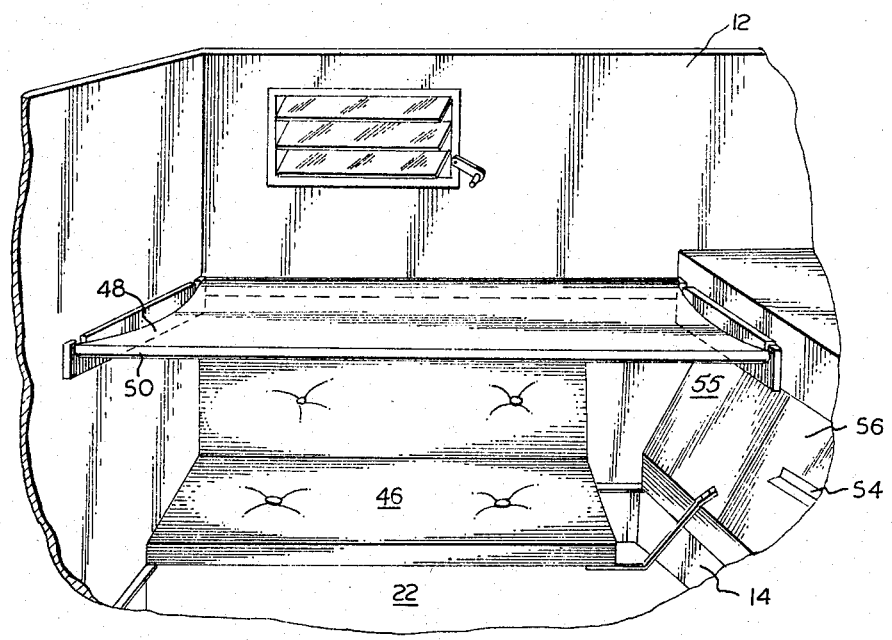
FIG. 7 is a fragmentary enlarged view of the accommodation and sleeping area within the camper body immediately overlying the trunk opening of the automobile.

Thus as seen in the semi-diagrammatic views of FIGS. 6 and 7, the trunk compartment area 22 provides room for occupants of the camper 10 who may be seated upon the bench seats 46 provided on either side of the camper body, only one of which being shown. As seen in FIG. 7, roll-up cots 48 are provided above each seat 46 which are normally retained in rolled condition adjacent the camper body side wall during the day, but may be unrolled and extended to the position shown in FIG. 7 at night, the cot rail 50 thereof being received within suitable support and lock notches provided within the camper body. In the forward portion of the body 12 overlying the roof of the vehicle 16, there is provided a full width mattress or like cushion 52. Thus it will be readily appreciated that with the standardized design of the camper 10 according to my invention, I provide sleeping accommodations for at least six persons, wherein the full width forward mattress area 52 and the rearwardly located rollable cots 48 may accommodate at least four persons of adult size, while the seats 46 on either side of the body of somewhat shorter length will likewise each accommodate a child or a shorter adult.

Access to the forward sleeping portion of the body 12 is facilitated by means of step 54 carried by a panel 56 which is hinged at its lower end to the upwardly inclined step wall 55 of the camper body which is disposed in proximity to the rear windshield of the vehicle. The panel 56 performs a double purpose in not only serving as a step to the forward sleeping compartment, but may also be pivoted rearwardly to substantially horizontal position and conveniently supported to provide a small table for the use of persons seated at benches 46 when desired.

What is claimed is:

1. A composite camper body for use with automobiles having rearwardly extending rear deck portions,
    said body comprising a first major portion providing enclosed passenger accommodations, and having means for detachably affixing the forward part thereof to an automobile,
    and a second minor portion disposed between the lower rear part of said major body portion and the upper surface of the rear trunk deck of an automobile,
    means detachably securing said major portion to said minor portion,
    means for detachably securing said minor portion to the automobile,
    said minor portion having a lower surface configuration substantially complementary to the surface configuration of the automobile rear deck area.

2. The composite camper body of claim 1 further including seal means externally overlying the joint therebetween.

3. The composite camper body of claim 2 wherein said seal means is detachably secured to said major and minor body portions and includes an external metallic trim strip having gasket material internally thereof in contact with the camper body portions.

4. The camper body of claim 2 wherein said major portion is of substantially inverted L-shaped configuration in side elevation and wherein said lower rear part thereof is open downwardly, and wherein said minor body portion comprises an open frame, whereby the open passenger-accommodating space within said body also utilizes the trunk space of the automobile.

5. An auxiliary passenger compartment mountable upon a passenger car sedan having a rear trunk opening, comprising
    an open adapter frame of substantially rectangular outline having a lower periphery substantially conforming to the surface contour of an automobile rear deck for substantially surrounding the trunk opening of the automobile, means mounted internally of said frame and extending internally of said trunk opening for detachably connecting said frame to an automobile,
a passenger body portion providing sleeping accommodations having a lower rear portion thereof of a substantially rectangular outline corresponding to that of said adapter frame for seating thereon,
and means for detachably securing said body portion to said adapter and means for detachably affixing the forward portion of said body portion to the car roof.

6. An auxiliary composite camper body unit having a maximum passenger capacity for interchangeable selective use upon a plurality of passenger automobiles having rear trunk decks, said body unit comprising
an enclosed major portion defining a passenger compartment including a forward part for disposition in overlying relation to the roof of a passenger automobile and a rearward part of greater effective height than said forward part having side walls extending in downwardly offset relation to the floorline of said forward part, said side walls defining a substantially rectangular lower unfloored perimetral opening,
and a plurality of adapter portions, each said portion being cooperatively associated with said major portion and selectively cooperable with the rear trunk deck portion of passenger automobiles,
each said adapter portion being characterized by a substantially rectangular frame corresponding to that of the lower side wall portion of said major portion for detachable connection thereto, the lower perimeter of each said adapter portion respectively having a contour substantially complementary to that of the selected automobile to which the same is applied and attached,
whereby said major body portion may be interchanged between automobiles of diverse styles to which selected adapters corresponding thereto have been detachably affixed.

7. A composite camper body for detachable connection to sedan automobiles having a rearwardly extending deck portion including an upwardly facing trunk space opening,
said body having enclosed passenger sleeping accommodations comprising a body portion including a forward part for overlying the roof of an automobile for detachable connection thereto, and a rearward part of greater vertical height than said forward part and including a lower rear portion extending downwardly relative to said forward part, said lower rear portion being unfloored and defining a downwardly facing opening for open communication with the trunk space of the automobile upon which said body is mounted to thereby maximize the available passenger space,
and said lower rear body portion including an open frame portion detachably connected to the remainder of said body,
and said frame portion having means thereon for detachably connecting said body to said automobile in substantially surrounding relation to said automobile trunk space.

8. A composite camper body for automobiles having enclosed passenger sleeping accommodations comprising
a body portion including a forward part for overlying the roof of an automobile for detachable connection thereto, and a rearward part of greater vertical height than said forward part and including a lower rear portion extending downwardly relative to said forward part,
bunk-like accommodations in said forward part extending substantially the full width thereof,
storable cot-like accommodations in said rearward part on each side wall thereof and disposed at substantially the floorline level of said forward part and defining a space therebetween and seat-like accommodations in the lower portion of said rearward part on each side wall thereof below said cot-like accommodations and defining a space therebetween,
a step disposed at the junction of said forward and rearward parts in the said space defined between the rear part cot- and seat-like accommodations to facilitate access to said forward part, and
a panel hinged to said body with said panel carrying said step, whereby said panel may be pivoted on its hinge outwardly into said defined space for use as a table.

References Cited by the Examiner

UNITED STATES PATENTS

| | | |
|---|---|---|
| D. 192,795 | 5/1962 | Sloat. |
| 789,961 | 5/1905 | Call. |
| 2,591,380 | 4/1952 | Schreiner _____ 296—10 X |
| 2,614,882 | 10/1952 | Cook _____ 296—23 |
| 2,645,518 | 7/1953 | Cook _____ 296—23 |

FOREIGN PATENTS 537,845  3/1922  France.

BENJAMIN HERSH, *Primary Examiner.*

P. GOODMAN, *Assistant Examiner.*